United States Patent
Cui et al.

(10) Patent No.: US 11,550,529 B2
(45) Date of Patent: Jan. 10, 2023

(54) VEHICLE DUAL-SYSTEM COMPATIBLE CONTROL METHOD AND SYSTEM, STORAGE MEDIUM AND VEHICLE-MOUNTED TERMINAL

(71) Applicant: Faurecia Clarion Electronics (Foshan) Limited Company, Foshan (CN)

(72) Inventors: Baosheng Cui, Foshan (CN); Chao Luo, Foshan (CN); Zhichu Yang, Foshan (CN); Weijian Xuan, Foshan (CN); Liang Liu, Foshan (CN); Longjun He, Foshan (CN)

(73) Assignee: FAURECIA CLARION ELECTRONICS (FOSHAN) LIMITED COMPANY, Foshan (CN)

( * ) Notice: Subject to any disclaimer, the term of this patent is extended or adjusted under 35 U.S.C. 154(b) by 0 days.

(21) Appl. No.: 17/499,098

(22) Filed: Oct. 12, 2021

(65) Prior Publication Data

US 2022/0113923 A1  Apr. 14, 2022

(30) Foreign Application Priority Data

Oct. 14, 2020 (CN) .......................... 202011098836.1

(51) Int. Cl.
*G06F 3/14* (2006.01)
*G06F 3/0488* (2022.01)
*G06F 3/16* (2006.01)

(52) U.S. Cl.
CPC .............. *G06F 3/14* (2013.01); *G06F 3/0488* (2013.01); *G06F 3/162* (2013.01); *G06F 3/165* (2013.01)

(58) Field of Classification Search
CPC ... G06F 3/14; G06F 3/147; G06F 3/16; G06F 3/0481; G06F 3/0488; B60K 2370/52;
(Continued)

(56) References Cited

U.S. PATENT DOCUMENTS

| 2013/0106750 A1* | 5/2013 | Kurosawa | G06F 9/452 345/173 |
| 2016/0205521 A1* | 7/2016 | Kim | B60K 37/02 701/36 |
| 2018/0345789 A1* | 12/2018 | Nikulin | B60K 35/00 |

FOREIGN PATENT DOCUMENTS

| CN | 105487869 A | 4/2016 |
| CN | 105034808 B | 10/2017 |

(Continued)

OTHER PUBLICATIONS

Faurecia Intellectual Property Patentability Study Report, IDF: IDFSHA20090, Jun. 18, 2020, pp. 1-13.

*Primary Examiner* — Priyank J Shah
(74) *Attorney, Agent, or Firm* — Morgan, Lewis & Bockius LLP

(57) ABSTRACT

A vehicle dual-system compatible control method includes: building a first system and a second system respectively on two independent processors, the first system communicating with a display screen, an audio output unit and a touch screen; obtaining, by the first system, touch coordinates on the touch screen, and determining a type of an application currently being executed; sending, by the first system, a video signal to the display screen, and outputting an audio output signal to the audio output unit when an application in the first system is executed; sending, by the second system, a video signal to the display screen, outputting an audio output signal to the audio output unit through data interfaces of the first system, and obtaining touch coordinates of an application in the second system when the application in the second system is executed.

11 Claims, 3 Drawing Sheets

(58) Field of Classification Search
CPC .......... B60K 2370/56; B60K 2370/563; B60K 2370/569; H04M 1/724098
See application file for complete search history.

(56) References Cited

FOREIGN PATENT DOCUMENTS

| | | | | |
|---|---|---|---|---|
| CN | 110515667 A | | 11/2019 | |
| CN | 106951202 B | * | 1/2021 | ........... G06F 3/1454 |

* cited by examiner

VEHICLE DUAL-SYSTEM COMPATIBLE CONTROL METHOD AND SYSTEM, STORAGE MEDIUM AND VEHICLE-MOUNTED TERMINAL

CROSS-REFERENCE TO RELATED APPLICATION

This application claims priority to Chinese Patent Application No. 202011098836.1, filed on Oct. 14, 2020, which is incorporated herein by reference in its entirety.

TECHNICAL FIELD

The present disclosure relates to the field of electronic information technology, and more particularly to, a vehicle dual-system compatible control method and system, a storage medium and a vehicle-mounted terminal.

BACKGROUND

At present, an operation system adopted by a vehicle-mounted host on the market is the Linux system or the Android system. These two types of products have corresponding advantages and disadvantages. The vehicle-mounted host adopted with the Linux system has advantages of less hardware resources, low price and easy connection to Carplay and Android Auto, but application software thereof is less, especially map software. The vehicle-mounted host adopted with the Android system has relatively rich application software, but has high requirements for performance and memory of a processor.

SUMMARY

A vehicle dual-system compatible control method and system, a storage medium, a vehicle-mounted terminal and computer program product are provided, which may have advantages of the two operating systems simultaneously.

In a first aspect, a vehicle dual-system compatible control method is provided. The method includes: building a first system and a second system respectively on two independent processors, the first system communicating with a display screen, an audio output unit and a touch screen; the first system obtaining touch coordinates on the touch screen and determining a type of an application currently being executed; the first system sending a video signal to the display screen and outputting an audio output signal to the audio output unit when an application in the first system is executed; and the second system sending a video signal to the display screen and outputting an audio output signal to the audio output unit through data ports of the first system, and obtaining touch coordinates of an application in the second system, when the application in the second system is executed.

In some embodiments, the method further includes: the second system sending the video signal and/or the audio output signal to the first system through the data ports of the first system; and the first system processing the video signal and/or the audio output signal of the second system by invoking a signal conversion function, and sending the processed video signal to the display screen and/or sending the processed audio output signal to the audio output unit.

In some embodiments, the method further includes: loading a virtual screen program to communicate with the first system and the second system; and the second system obtaining the touch coordinates generated by operating the application in the second system through the virtual screen program when the application in the second system is executed.

In some embodiments, the first system and the second system obtain audio input signals from an audio input unit.

In a second aspect, a vehicle dual-system compatible control system is provided. The system includes: a display screen, an audio output unit and a touch screen; a first system built on an independent processor, and configured to communicate with the display screen, the audio output unit and the touch screen, obtain touch coordinates on the touch screen and determine a type of a current application, and send a video signal to the display screen and output an audio output signal to the audio output unit when an application in the first system is executed; and a second system built on another independent processor, and configured to send a video signal to the display screen and output an audio output signal to the audio output unit through data ports of the first system, and obtain touch coordinates of an application in the second system when the application in the second system is executed.

In some embodiments, the second system is further configured to be connected to the first system through the data interfaces of the first system, so as to send the video signal and/or the audio output signal to the first system; and the first system is further configured to process the video signal and/or the audio output signal of the second system by invoking a signal conversion function, and send the processed video signal to the display screen and/or send the processed audio output signal to the audio output unit.

In some embodiments, the system further includes a conversion module. The conversion module is configured to load a virtual screen program to communicate with the first system and the second system, and send the touch coordinates generated by operating the application in the second system to the second system when the application in the second system is executed.

In some embodiments, the system further includes an audio input unit. The audio input unit is configured to obtain audio input signals, and send the audio input signals to the first system and the second system.

In a third aspect, a non-transitory computer-readable storage medium is provided. The non-transitory computer-readable storage medium stores a computer program that, when executed by a processor, performs the vehicle dual-system compatible control method described in the first aspect.

In a fourth aspect, a vehicle-mounted terminal is provided. The vehicle-mounted terminal includes a first processor, a second processor and a memory. The memory is configured to store a computer program. The first processor is configured to build a first system, the second processor is configured to build a second system; the first processor and the second processor are further used to execute the computer program, so that the vehicle-mounted terminal performs the vehicle dual-system compatible control method described in the first aspect.

Beneficial effects of the present disclosure are as follows. The two operating systems are integrated into one, so that the two operating systems are compatibly applied to the vehicle-mounted terminal. Therefore, it may have advantages of the two systems, and have good stability and system independence. It may be used normally in a case where one hardware or software is damaged, and there are no strict requirements for performance of the processor.

DETAILED DESCRIPTION

Figure 1:
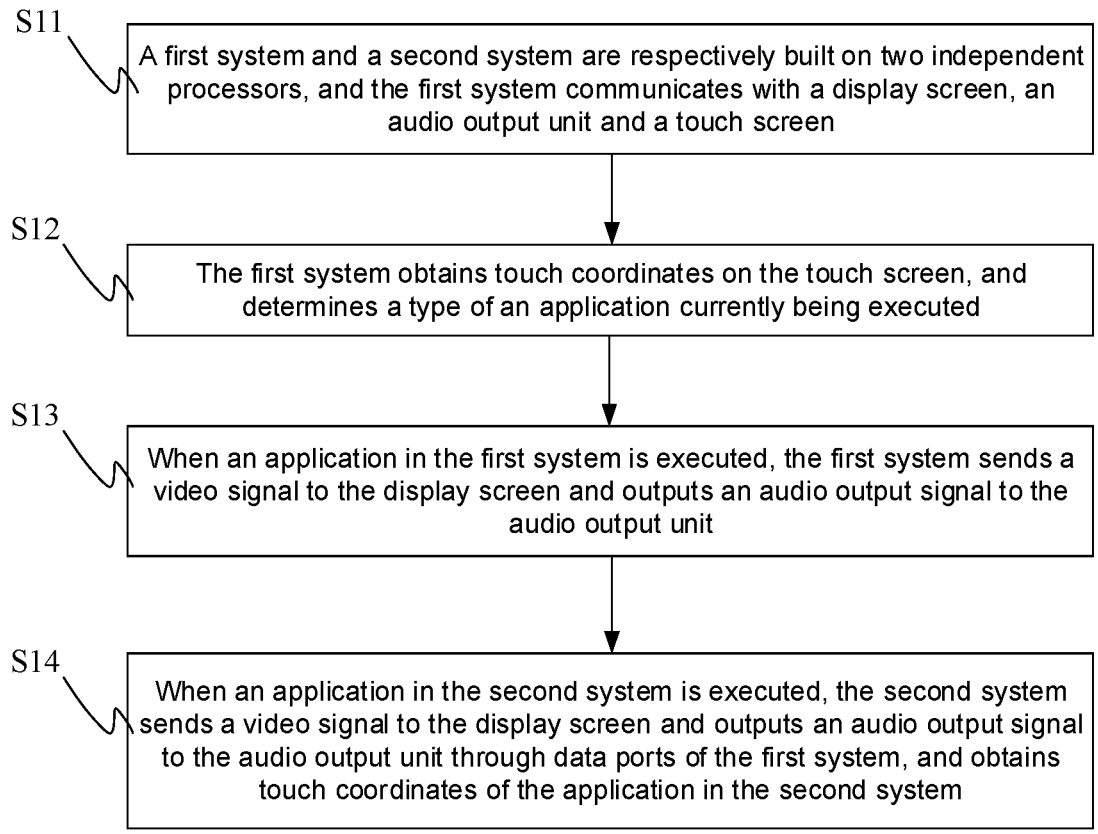
FIG. 1 is a flowchart of a vehicle dual-system compatible control method, in accordance with some exemplary embodiments.

Exemplary embodiments will be described in detail, and examples thereof are shown in accompanying drawings. When the following description refers to the accompanying drawings, unless otherwise indicated, same numbers in different drawings indicate same or similar elements. Implementation manners described in the following exemplary embodiments do not represent all implementation manners consistent with the present disclosure. On the contrary, they are merely examples of devices and methods consistent with some aspects of the present disclosure as detailed in the appended claims.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to."

In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled", "connected" and their derivatives may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "configured to" as used herein indicates an open and inclusive expression, which does not exclude devices that are configured to perform additional tasks or steps.

According to a first aspect of embodiments of the present disclosure, a vehicle dual-system compatible control method is provided. FIG. 1 is a flowchart of a vehicle dual-system compatible control method in accordance with some exemplary embodiments. As shown in FIG. 1, the method includes following steps.

In S11, a first system and a second system are respectively built on two independent processors, and the first system communicates with a display screen, an audio output unit and a touch screen.

The display screen achieves a display function, the audio output unit achieves an audio output function, and the touch screen achieves a touch function. The first system and the second system are respectively built on the two independent processors, and the processor of the first system communicates with the display screen, the touch screen and the audio output unit.

In S12, the first system obtains touch coordinates on the touch screen, and determines a type of an application currently being executed.

In S13, when an application in the first system is executed, the first system sends a video signal to the display screen and outputs an audio output signal to the audio output unit.

In S14, when an application in the second system is executed, the second system sends a video signal to the display screen and outputs an audio output signal to the audio output unit through data ports of the first system, and obtains touch coordinates of the application in the second system.

During an actual use, the first system and the second system are running simultaneously, and the first system and the second system each perform corresponding functions thereof. The first system directly communicates with the display screen, the audio output unit and the touch screen, and directly controls the display function, the audio output function and the touch function. Therefore, default content displayed on the display screen is a system interface of the first system. The system interface of the first system includes icons for application programs in the two systems. Touch coordinates generated by a user touching the touch screen are sent to the first system by default, and a response is given by the first system. When the user touches and starts an application program in the second system on the system interface of the first system, the first system sends a start instruction of the application program to the second system. A video signal and an audio output signal of the application program are output to corresponding data ports of the first system, instead of an original interface display and an original audio output. When the touch operation is performed on the application program in the second system, the second system obtains touch coordinates generated by the touch operation from the first system, so as to control and adjust the application program in the second system.

For example, the Linux system is as the first system and the Android system is as the second system. At least a Carplay application and an Android Auto application are installed in the first system, and at least a navigation application is installed in the second system. Application icons for the Carplay application, the Android Auto application and the navigation application are all present in the system interface of the first system for the user to use. After the first system and the second system are started normally, the system interface of the first system is shown to the user. When the user selects the Carplay application or the Android Auto application by touching, the selected application is executed in an environment of the first system. When the user selects the navigation application by touching, the first system sends a start instruction to enable the second system to start the navigation application. After the first system obtains a video signal and an audio output signal contained in the navigation application, the video signal and the audio output signal are output through the display screen and the audio output unit, respectively. When the user performs touch operation on the navigation application, touch coordinates obtained by the first system is sent to the second system.

Figure 2:
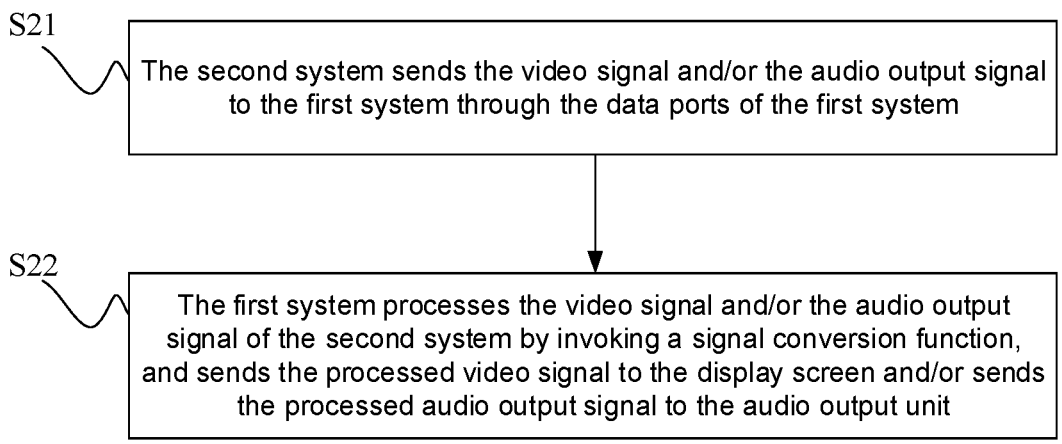
FIG. 2 is a flowchart of a vehicle dual-system compatible control method, in accordance with some other exemplary embodiments.

FIG. 2 is a flowchart of a vehicle dual-system compatible control method in accordance with some other exemplary embodiments. As shown in FIG. 2, a transmission and conversion manner for the video signal and/or the audio output signal between the dual systems is provided. The method further includes following steps.

In S21, the second system sends the video signal and/or the audio output signal to the first system through the data ports of the first system.

In S22, the first system processes the video signal and/or the audio output signal of the second system by invoking a signal conversion function, and sends the processed video signal to the display screen and/or sends the processed audio output signal to the audio output unit.

For example, when the first system detects that the user clicks on the application program in the second system through the touch screen, the first system sends a start instruction that starts the application program to the second system. The video signal and the audio output signal of the application program of the second system are respectively transmitted to the first system through two types of data ports, and then are output after being converted by the first system.

For example, the video signal of the second system is transmitted to the first system through an RGB888 port, and the audio output signal of the second system is transmitted to the first system through a DSP (Digital Signal Processor) port. The first system invokes an API (Application Programming Interface) function therein to convert the video signal and the audio output signal.

Figure 3:
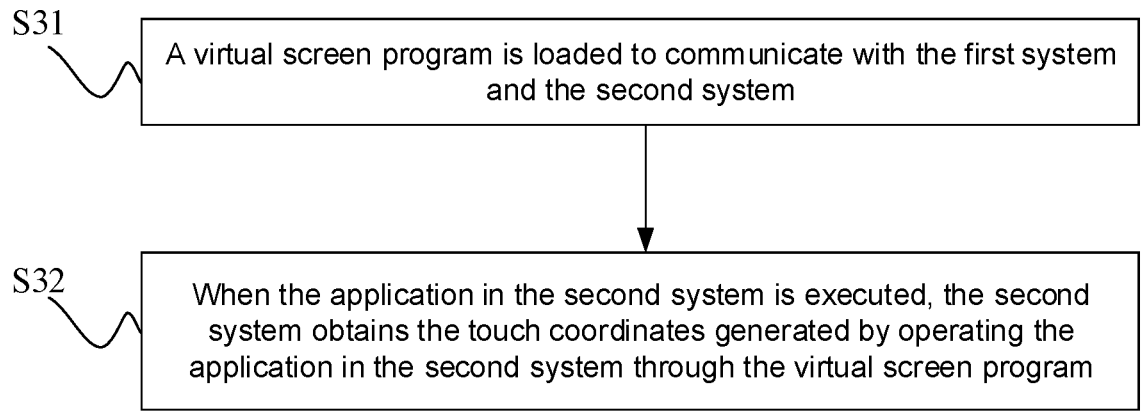
FIG. 3 is a flowchart of a vehicle dual-system compatible control method, in accordance with some yet other exemplary embodiments.

FIG. 3 is a flowchart of a vehicle dual-system compatible control method in accordance with yet some other exemplary embodiments. As shown in FIG. 3, the method further includes following steps.

In S31, a virtual screen program is loaded to communicate with the first system and the second system.

In S32, when the application in the second system is executed, the second system obtains the touch coordinates generated by operating the application in the second system through the virtual screen program.

The virtual screen program is stored in a microprocessor, and the microprocessor communicates with the first system and the second system. When the second system is started, the microprocessor immediately loads the virtual screen program therein to obtain the touch coordinates generated by the user operating the application in the second system, and converts a format of the touch coordinates into a format that is able to be read by the second system. The virtual screen program is an intermediate software layer that runs between the first system and the second system. The virtual screen program is built on the microprocessor, so that the second system may identify a virtual touch screen. The virtual screen program, as a basis of inputting the touch coordinates of the second system, may ensure a safe isolation of the touch coordinates in the system.

In some embodiments, the first system and the second system both obtain audio input signals through an audio input unit. The audio input unit directly communicates with the first system and the second system, and sends a corresponding audio input signal to the first system or the second system according to a type of the current application. For example, as for the first system equipped with a Bluetooth module, the audio input signal enters the first system as an audio of a Bluetooth call. As for the second system equipped with a voice control module, the audio input signal enters the second system to achieve a voice control function.

Figure 4:
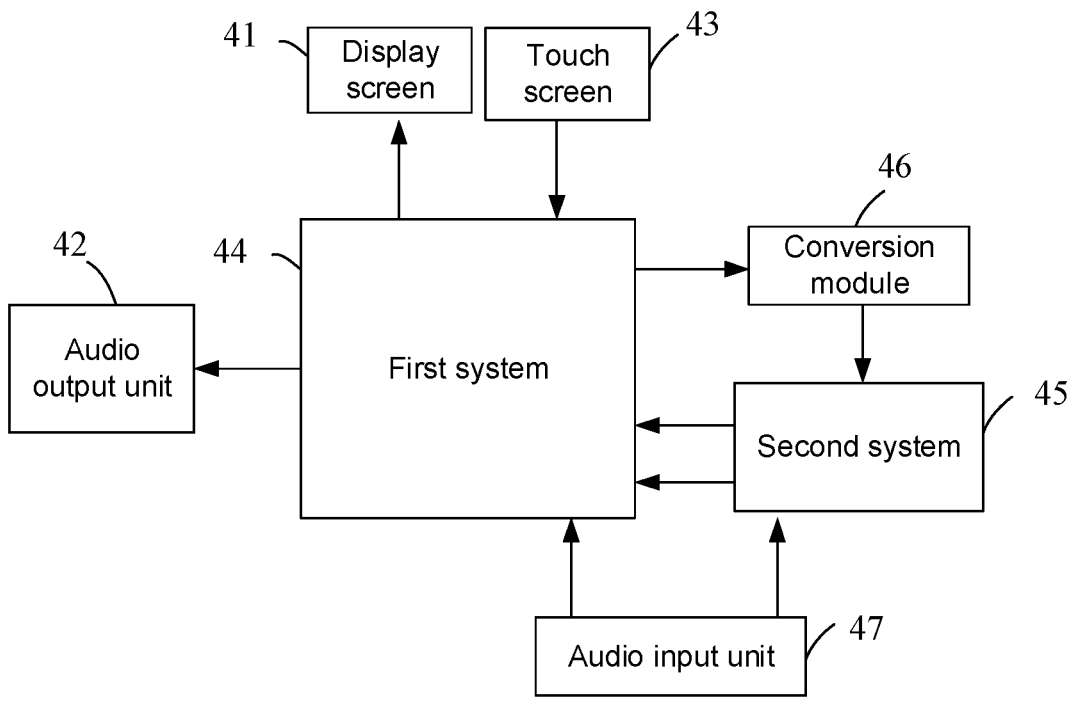
FIG. 4 is a block diagram of a vehicle dual-system compatible control system, in accordance with some exemplary embodiments.

According to a second aspect of embodiments of the present disclosure, a vehicle dual-system compatible control system is provided. FIG. 4 is a block diagram of a vehicle dual-system compatible control system in accordance with some exemplary embodiments. The vehicle dual-system compatible control system mainly includes a display screen 41, an audio output unit 42, and a touch screen 43.

The first system 44 is built on an independent processor. The first system 44 is configured to communicate with the display screen 41, the audio output unit 42 and the touch screen 43, so as to obtain touch coordinates on the touch screen 43 and determine a type of a current application, and send a video signal to the display screen 41 and output an audio output signal to the audio output unit 42 when an application in the first system 44 is executed.

The second system 45 is built on another independent processor. The second system 45 is configured to send a video signal to the display screen 41 and output an audio output signal to the audio output unit 42 through data ports of the first system 44, and obtain touch coordinates of an application in the second system 45, when the application in the second system 45 is executed.

In some examples, the second system 45 is further configured to be connected to the first system 44 through the data ports of the first system 44, so as to send the video signal and/or the audio output signal to the first system 44. The first system 44 is further configured to process the video signal and/or the audio output signal of the second system 45 by invoking a signal conversion function, and send the processed video signal to the display screen 41 and/or send the processed audio output signal to the audio output unit 42.

In some examples, the vehicle dual-system compatible control system further includes a conversion module 46. The conversion module 46 is configured to load a virtual screen program to communicate with the first system 44 and the second system 45, and send touch coordinates generated by operating an application of the second system 45 to the second system 45 when the application in the second system 45 is executed.

In some examples, the vehicle dual-system compatible control system further includes an audio input unit 47. The audio input unit 47 is configured to obtain audio input signals, and send the audio input signals to the first system 44 and the second system 45.

The audio output unit 42 includes for example a speaker. The audio input unit 47 includes for example a microphone. The conversion module 46 includes for example a chip, an integrated circuit or a microprocessor.

As for the vehicle dual-system compatible control system in the foregoing embodiments, exemplary manners for each module to perform operations have been described in details in the embodiments of the method, and detailed description will not be made here.

According to a third aspect of embodiments of the present disclosure, a non-transitory computer-readable storage medium is provided. The non-transitory computer-readable storage medium stores a computer program that, when executed by a processor, performs the vehicle dual-system compatible control method described in the first aspect.

The storage medium of the present disclosure stores the computer program that, when executed by the processor, performs the vehicle dual-system compatible control method described above. For example, the storage medium includes a variety of media that is able to store program codes, such as read-only memory (ROM), random access memory (RAM), a magnetic disk, or an optical disk.

Figure 5:
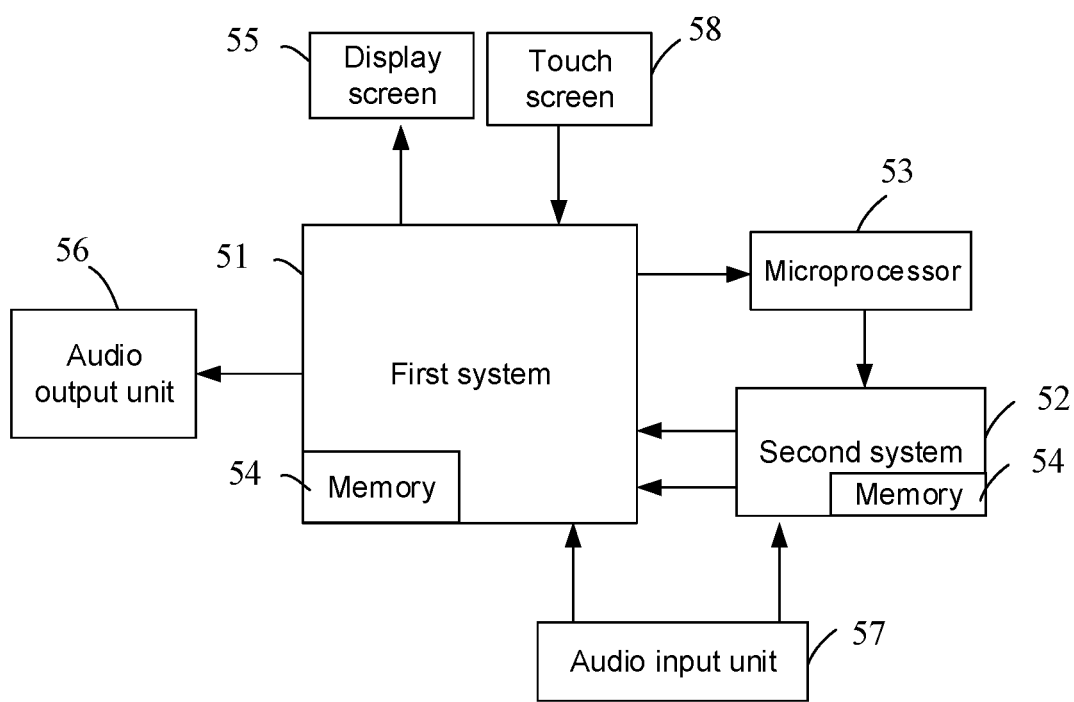
FIG. 5 is a block diagram of a vehicle-mounted terminal, in accordance with some exemplary embodiments.

According to a fourth aspect of embodiments of the present disclosure, a vehicle-mounted terminal is provided. FIG. 5 is a block diagram of a vehicle-mounted terminal in accordance with some exemplary embodiments.

Referring to FIG. 5, the vehicle-mounted terminal mainly includes a first processor 51, a second processor 52, a microprocessor 53, a memory 54, a display screen 55, an audio output unit 56, an audio input unit 57 and a touch screen 58.

The memory 54 is configured to store a computer program. For example, the memory 54 is configured to store various types of data to support operations on the vehicle-mounted terminal. These data includes, for example, instructions for any application program or method operating on the vehicle-mounted terminal, driving data, messages, pictures, and videos.

The first processor 51 is configured to build the first system. The second processor 52 is configured to build the second system. The first processor 51 and the second processor 52 are configured to execute the computer program in the memory 54, so that the vehicle-mounted terminal performs the vehicle dual-system compatible control method described in the first aspect.

The microprocessor 53 is configured to store a virtual screen program, so that the second system obtains touch coordinates on the touch screen 58 from the first system. The display screen 55 communicates with the first processor 51 and is configured to obtain a video signal. The audio output unit 56 communicates with the first processor 51 and is configured to obtain an audio output signal. The audio input unit 57 communicates with the first processor 51 and the second processor 52, and sends corresponding audio input signals to the first processor 51 and the second processor 52 respectively.

It will be noted that, according to some embodiments, the process described in the flowchart above can be implemented as a computer software program. For example, some embodiments include a computer program product, which includes a computer program tangibly contained on a non-volatile computer-readable storage medium. The computer program includes a program for executing the vehicle dual-system compatible control method described in the above embodiments. In such embodiments, the computer program may be downloaded and installed from the network through the communication part, and/or installed from a removable medium.

The flowcharts and schematic diagrams in the drawings illustrate the possible implementation architecture, functions, and operations of the systems, methods, and computer program products of some embodiments. In this regard, each block in the flowchart or schematic diagram may represent a module, a program segment, or part of the code, and the module, program segment, or part of the code contains one or more executable instructions for realizing the specified logic function. It will also be noted that, in some alternative implementations, the functions marked in the block may also occur in an order different from the order marked in the drawings. For example, two blocks shown in succession may actually be executed substantially in parallel, and they can sometimes be executed in the reverse order, depending on the functions involved. It will also be noted that, each block in the schematic diagram and/or flowchart and the combination of the blocks in the schematic diagram and/or flowchart may be implemented by a dedicated hardware-based system that performs the specified functions or operations, or may be implemented by a combination of dedicated hardware and computer instructions.

After considering the specification and practicing the present disclosure, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are pointed out by the claims.

It will be understood that the present disclosure is not limited to the precise structure that has been described above and shown in the drawings, and various modifications and changes will be made without departing from the scope thereof. The scope of the present disclosure is only limited by the appended claims.

What is claimed is:

1. A vehicle dual-system compatible control method, comprising:

building a first system and a second system respectively on two independent processors, the first system communicating with a display screen, an audio output unit and a touch screen; wherein the first system and the second system are both built in a vehicle; wherein the display screen displays a system interface of the first system, and the system interface of the first system includes icons for application programs in the first system and icons for application programs in the second system;

obtaining, by the first system, touch coordinates on the touch screen, and determining, by the first system, a type of an application currently being executed;

sending, by the first system, a video signal to the display screen, and outputting, by the first system, an audio output signal to the audio output unit, when an application in the first system is executed; and sending, by the second system, a video signal to the display screen through data ports of the first system, and outputting, by the second system, an audio output signal to the audio output unit through the data ports of the first system, and obtaining, by the second system, touch coordinates of an application in the second system, when an application in the second system is executed.

2. The vehicle dual-system compatible control method according to claim 1, further comprising:
sending, by the second system, the video signal and/or the audio output signal to the first system through the data ports of the first system;
processing, by the first system, the video signal and/or the audio output signal of the second system by invoking a signal conversion function; and
sending, by the first system, the processed video signal to the display screen and/or sending, by the first system, the processed audio output signal to the audio output unit.

3. The vehicle dual-system compatible control method according to claim 1, further comprising:
loading a virtual screen program to communicate with the first system and the second system; and
obtaining, by the second system, the touch coordinates generated by operating the application in the second system through the virtual screen program when the application in the second system is executed.

4. The vehicle dual-system compatible control method according to claim 1, wherein the first system and the second system obtain audio input signals from an audio input unit.

5. A vehicle dual-system compatible control system, comprising:
a display screen, an audio output unit and a touch screen; wherein the display screen is configured to display a system interface of a first system, and the system interface of the first system includes icons for application programs in the first system and icons for application programs in a second system;
the first system built on an independent processor, and configured to communicate with the display screen, the audio output unit and the touch screen, obtain touch coordinates on the touch screen and determine a type of a current application, and send a video signal to the display screen and output an audio output signal to the audio output unit when an application in the first system is executed; and
the second system built on another independent processor, and configured to send a video signal to the display screen and output an audio output signal to the audio output unit through data ports of the first system, and obtain touch coordinates of an application in the second system when the application in the second system is executed;
wherein the first system and the second system are both built in a vehicle.

6. The vehicle dual-system compatible control system according to claim 5, wherein the second system is further configured to be connected to the first system through the data ports of the first system, so as to send the video signal and/or the audio output signal to the first system; and
the first system is further configured to process the video signal and/or the audio output signal of the second system by invoking a signal conversion function, and send the processed video signal to the display screen and/or send the processed audio output signal to the audio output unit.

7. The vehicle dual-system compatible control system according to claim 5, further comprising a conversion module, wherein
the conversion module is configured to load a virtual screen program to communicate with the first system and the second system, and send the touch coordinates generated by operating the application in the second system to the second system when the application in the second system is executed.

8. The vehicle dual-system compatible control system according to claim 5, further comprising an audio input unit, wherein
the audio input unit is configured to obtain audio input signals, and send the audio input signals to the first system and the second system.

9. A non-transitory computer-readable storage medium storing a computer program that, when executed by a processor, performs the vehicle dual-system compatible control method according to claim 1.

10. A vehicle-mounted terminal, comprising a first processor, a second processor, and a memory, wherein
the memory is configured to store a computer program; and
the first processor is configured to build a first system; the second processor is configured to build a second system; and the first processor and the second processor are further configured to execute a computer program, so that the vehicle-mounted terminal performs the vehicle dual-system compatible control method according to claim 1.

11. A computer program product comprising computer instructions that are stored on a non-transitory computer-readable storage medium, and that, when executed on a computer, cause a computer to perform the vehicle dual-system compatible control method according to claim 1.

* * * * *